(12) United States Patent
Siess et al.

(10) Patent No.: US 12,135,241 B2
(45) Date of Patent: Nov. 5, 2024

(54) SPECTRAL RECONSTRUCTION OF DETECTOR SENSITIVITY

(71) Applicant: ams Sensors Germany GmbH, Jena (DE)

(72) Inventors: Gunter Siess, Oberterzen (CH); Julius Komma, Jena (DE)

(73) Assignee: ams Sensors Germany GmbH (DE)

( * ) Notice: Subject to any disclaimer, the term of this patent is extended or adjusted under 35 U.S.C. 154(b) by 14 days.

(21) Appl. No.: 17/609,153

(22) PCT Filed: Jun. 17, 2020

(86) PCT No.: PCT/EP2020/066816
§ 371 (c)(1),
(2) Date: Nov. 5, 2021

(87) PCT Pub. No.: WO2020/254438
PCT Pub. Date: Dec. 24, 2020

(65) Prior Publication Data
US 2022/0228913 A1 Jul. 21, 2022

Related U.S. Application Data

(60) Provisional application No. 62/862,818, filed on Jun. 18, 2019.

(51) Int. Cl.
*G01J 3/52* (2006.01)
*G01J 3/10* (2006.01)
(Continued)

(52) U.S. Cl.
CPC ............... *G01J 3/524* (2013.01); *G01J 3/10* (2013.01); *G01J 3/28* (2013.01); *H04N 17/002* (2013.01)

(58) Field of Classification Search
CPC .... G01J 3/524; G01J 3/10; G01J 3/28; H04N 17/002; G05B 2219/24195;
(Continued)

(56) References Cited

U.S. PATENT DOCUMENTS 6,205,244 B1 * 3/2001 Bawolek ............... G06T 7/90
382/167
6,539,323 B2 * 3/2003 Olson ............... G01N 21/274
356/402

(Continued)

FOREIGN PATENT DOCUMENTS

CN 102735339 A 10/2012
DE 11201600710 T5 11/2017
(Continued)

OTHER PUBLICATIONS

Maryam Mohammadzadeh Darrodi, Graham Finlayson, Teresa Goodman, and Michal Mackiewicz, "Reference data set for camera spectral sensitivity estimation," J. Opt. Soc. Am. A 32, 381-391 (2015) (Year: 2015).*

(Continued)

*Primary Examiner* — Michelle M Iacoletti
*Assistant Examiner* — Noah J. Haney
(74) *Attorney, Agent, or Firm* — Michael Best & Friedrich LLP

(57) ABSTRACT

The present disclosure describes a method and apparatus that uses spectral reconstruction of detector sensitivity to solve the above and other problems. Specifically, light sources (e.g., of visible light, infrared light and/or ultraviolet light) may target the sensor and emit, in sequence, beams of different wavelength. Spectral output of multiple channels of the sensor is received, the output including intensity (e.g., peak intensity) for each channel. The output is compared with reference intensities for each of the light sources and (Continued)

difference values are calculated. Based on the difference values, a calibration matrix is calculated that can be used in calibrating the specific sensor. In addition, the present disclosure describes an apparatus that includes a plurality of light sources, a receiver for receiving sensor output, and circuitry configured to generate a calibration matrix using the light sources, the receiver using spectral reconstruction of detector sensitivity.

19 Claims, 8 Drawing Sheets

(51) Int. Cl.
  *G01J 3/28* (2006.01)
  *H04N 17/00* (2006.01)
(58) Field of Classification Search
  CPC .......... G05B 2219/24042; G05B 2219/31483; G05B 2219/37008
  USPC ....................................................... 356/402
  See application file for complete search history.

(56) References Cited

U.S. PATENT DOCUMENTS

| | | | | |
|---|---|---|---|---|
| 9,952,102 | B1* | 4/2018 | Xu | G01J 3/0297 |
| 10,267,677 | B1* | 4/2019 | Sarkar | G01J 1/4204 |
| 10,768,048 | B2* | 9/2020 | Nagai | G01J 3/0297 |
| 2003/0011767 | A1* | 1/2003 | Imura | G01J 3/28 |
| | | | | 356/326 |
| 2006/0290929 | A1* | 12/2006 | Imura | G01J 3/02 |
| | | | | 356/328 |
| 2007/0263213 | A1* | 11/2007 | Stedman | G01J 3/28 |
| | | | | 250/222.2 |
| 2013/0182256 | A1* | 7/2013 | Kubota | G01J 3/42 |
| | | | | 356/402 |
| 2014/0176729 | A1* | 6/2014 | Saari | G01J 3/0208 |
| | | | | 348/182 |
| 2015/0168184 | A1* | 6/2015 | Schweid | G01J 3/524 |
| | | | | 702/85 |
| 2016/0245695 | A1 | 8/2016 | Lee | |
| 2017/0084250 | A1 | 3/2017 | Jia et al. | |
| 2017/0374260 | A1* | 12/2017 | Ichikawa | G01J 3/28 |
| 2018/0010966 | A1* | 1/2018 | Ichikawa | H04N 1/6041 |
| 2019/0170585 | A1* | 6/2019 | Okada | G01J 3/524 |
| 2020/0056939 | A1 | 2/2020 | Ishizaki et al. | |

FOREIGN PATENT DOCUMENTS

| | | | | |
|---|---|---|---|---|
| DE | 102017119944 A1 * | 2/2019 | | G01J 3/10 |
| JP | 2009065710 A * | 3/2009 | | G01J 3/10 |
| TW | 200926839 A | 6/2009 | | |
| WO | WO-2010123499 A1 * | 10/2010 | | H04N 17/002 |

OTHER PUBLICATIONS

International Search Report for corresponding International Application No. PCT/EP2020/066816, dated Sep. 16, 2020.
Chinese Patent Office First Action for Application No. 202080044682 dated Jun. 15, 2024 (21 pages including English translation).
Taiwanese Patent Office Action for Aplication No. 109120662 dated May 27, 2024 (26 pages with English machine translation).

* cited by examiner

200

202 — Receive, from a sensor, spectral sensitivity data, where the spectral sensitivity data is generated based on spectral responses of a plurality of spectral channels of a sensor to emissions from a plurality of light sources

204 — Convert the spectral sensitivity data into a plurality of spectral sensitivity data values, wherein each of the plurality spectral sensitivity data values represents a spectral response of a channel of the plurality of spectral channels to an emission from a light source of the plurality of light sources

206 — Retrieve, from the memory, a plurality of reference spectral sensitivity data values for each of the plurality of lights, each spectral sensitivity data value corresponding to a channel of the plurality of spectral channels

208 — Compare each of the plurality of spectral sensitivity data values to a corresponding reference value of the plurality of reference spectral sensitivity data values

210 — Calculate, for the plurality of spectral sensitivity data values and based on the comparing, a plurality of difference values

212 — Generate, based on the plurality of difference values, a calibration matrix for the sensor

Fig. 2

$$M = \begin{pmatrix} c_{1,1} & c_{1,2} & c_{1,3} \\ c_{2,1} & c_{2,2} & c_{2,3} \\ c_{3,1} & c_{3,2} & c_{3,3} \end{pmatrix}$$

300, 302

320 matrix example

| 1.130 | -0.135 | -0.028 |
|---|---|---|
| -0.205 | 1.145 | 0.068 |
| -0.054 | 0.051 | 1.007 |

SPECTRAL RECONSTRUCTION OF DETECTOR SENSITIVITY

FIELD OF THE DISCLOSURE

This disclosure relates to sensor calibration.

BACKGROUND

A typical method for calibrating spectral sensors involves target calibration. Generally, a set of targets or light sources with known spectral and colorimetric values is measured and based on the ratios of the target values to the sensor output a calibration matrix can be calculated. There is a number of problems with this approach. One problem is that this type of calibration will be accurate for targets or light sources similar to the calibration targets or light sources, but for targets that are dissimilar, calibration will not be nearly as accurate. Another problem is that setup and testing for different types of sensor will take a long time and is not feasible in some scenarios.

SUMMARY

The present disclosure describes a method and apparatus that uses spectral reconstruction of detector sensitivity to solve the above and other problems. Specifically, one or more light sources and/or a configurable light source (e.g., of visible light, infrared light and/or ultraviolet light) may emit, in sequence, light beams of different wavelength (e.g., infrared light, visible light, ultraviolet light). Spectral output of multiple channels of the sensor is received, the output including intensity (e.g., peak intensity) for each channel. The output is compared with reference intensities for each of the one or more light sources and/or the configurable light source and difference values are calculated. Based on the difference values, a calibration matrix is calculated that can be used in calibrating the specific sensor. In addition, the present disclosure describes an apparatus that includes one or more light sources and/or the configurable light source, a receiver for receiving sensor output, and circuitry configured to generate a calibration matrix using the light sources, the receiver using spectral reconstruction of detector sensitivity.

The described techniques may be executed, for example, by a hardware device. In some implementations, the hardware device may be used in combination with software to execute the actions described in this disclosure. This disclosure will refer to the hardware and/or software that performs the method of spectral reconstruction of detector sensitivity as a calibration device. In some implementations, the calibration device includes memory and control circuitry coupled to the memory. The calibration device receives, from a sensor, spectral sensitivity data, where the spectral sensitivity data is generated based on spectral responses of spectral channels of the sensor to emissions from one or multiple light sources, which may comprise one or more configurable light sources.

For example, the calibration device may cause a first emission from a first light source of the multiple light sources, the first light source emitting light of a first wavelength, and store spectral response from the spectral channels to the first emission. The calibration device may then cause a second emission from a second light source of the multiple light sources, the second light source emitting light of a second wavelength, and store spectral response from the plurality of channels to the second emission. These emissions may be performed sequentially and sensor output, responsive to each emissions, may be stored. The received spectral sensitivity data may be in the form of a voltage reading or may be further processed and peak intensity data for each channel may be received.

In another example, the calibration device may cause a first emission from the configurable light source, the first emission having a first range of wavelengths, and may store a spectral response from the spectral channels to the first emission. The calibration device may then cause a second emission from the configurable light source, the second emission having a second range of wavelengths, and may store a spectral response from the plurality of channels to the second emission. These emissions may be performed sequentially and sensor output, responsive to each emissions, may be stored. The received spectral sensitivity data may be in the form of a voltage reading or may be further processed and peak intensity data for each channel may be received. The light source may be configurable to emit radiation having the first range of wavelengths. The light source may be configurable to emit radiation having the second range of wavelengths. The light source may be configured to select a range of wavelengths of radiation emitted by the light source.

In some implementations, the calibration device converts the spectral sensitivity data into spectral sensitivity data values, where each spectral sensitivity data value represents a spectral response of a channel of the multiple spectral channels to an emission from a light source of the one or more light sources mentioned above. For example, if the spectral data is received in the form of voltages, that calibration device converts the voltages into intensity values or peak intensity values. In some implementations, the calibration device converts the intensity values or the peak intensity values into scaled values (e.g., on a scale from zero to one or from minus one to one) that can be compared with the reference spectral sensitivity values. In some implementations, other methods of data conversion may be used to convert the spectral response data to a state where it can be compared with the reference spectral sensitivity data.

The calibration device retrieves, from the memory, reference spectral sensitivity data values for each of the one or multiple light sources, each spectral sensitivity data value corresponding to a channel of the spectral channels discussed above. The reference spectral sensitivity data may be stored in various forms. For example, this data may be stored as scaled intensity values (e.g., on a scale of zero to one or minus one to one), unscaled peak intensity values, voltages or other suitable values that can be compared with sensor spectral channel outputs.

The calibration device compares each of the plurality of spectral sensitivity data values to a corresponding reference value of the reference spectral sensitivity data values. For example, the calibration device may compare scaled intensity values, peak intensity values, voltages or other suitable values. Based on the comparison, the calibration device calculates, for the spectral sensitivity data values, difference values. In some implementations, the difference values may be differences in scaled intensity values, differences in peak intensity values, differences in voltages, differences in percentages, or other suitable values.

The calibration device generates, based on the difference values, a calibration matrix for the sensor. For example, the calibration matrix may be a data structure that stores the difference values for each of the channels of the sensor. Thus, each of the difference values may correspond to a specific wavelength or wavelength range. In some implementations, this method may be used to calibrate a sensor in a specific device. In those implementations, the calibration device transmits the calibration matrix to a device that is hosting the sensor. In some implementations, the calibration device stores for each wavelength (e.g., for each available wavelength point) a corresponding difference value.

In some implementations, the spectral sensitivity data values are peak intensity values for wavelengths corresponding to the spectral channels. For example, as each emission from the one or more light sources is detected by the sensor, each channel of the sensor records a peak voltage corresponding to the emission. In some implementations, that voltage is converted into a peak intensity value or the voltage is stored as the peak intensity value.

In some implementations, the calibration device is an apparatus that includes an illumination source (e.g., a light box) with a multitude of illuminators (lights that may emit visible light, ultraviolet light, infrared light, or another suitable light).

In some implementations, the calibration device is an apparatus that includes an illumination source (e.g., a light box) with one or more illuminators (lights that may emit visible light, ultraviolet light, infrared light, or another suitable light), wherein at least one of the one or more illuminators is configurable to emit light with selectable characteristics, such as a selectable wavelength and/or selectable peak intensity.

The apparatus also includes a receiver operable to receive spectral response data for spectral channels (e.g., of a sensor). In some implementations, the receiver is operable to receive any kind of spectral sensitivity data. The apparatus also includes control circuitry (e.g., one or more processors) coupled to the illumination source and the receiver.

In some implementations, the control circuitry is configured to cause the illumination source to initiate each of the plurality of illuminators sequentially. For example, the processor may transmit a command for each of the lights to turn on and off in sequence so that the sensor is able to detect the light. The apparatus (e.g., calibration devices) receives, in the receiver, for each illuminator, spectral sensitivity data from each of the spectral channels of the sensor. For example, the receiver may receive voltages associated with peak intensity detected by each channel of the sensor. In some implementations, the spectral sensitivity data may be received in other formats (e.g., as scaled peak intensity values). In one example, the sensor may include a channel that responds to light at wavelength between 400 nanometers and 500 nanometers. The control circuitry may receive the peak intensity value for that channel for each illuminator.

In some implementations, the processor may transmit a command for an illuminator, e.g. an illuminator comprising a configurable light source, of the illumination source to emit radiation having the first range of wavelengths, and subsequently emit radiation having the second range of wavelengths. In some implementations, the processor may transmit a command for an illuminator of the illumination source to sequentially emit radiation having different wavelengths or ranges of wavelengths. The apparatus (e.g., calibration devices) receives, in the receiver, for each range of wavelengths from the illuminator, spectral sensitivity data from each of the spectral channels of the sensor. For example, the receiver may receive voltages associated with peak intensity detected by each channel of the sensor. In some implementations, the spectral sensitivity data may be received in other formats (e.g., as scaled peak intensity values). In one example, the sensor may include a channel that responds to light at wavelength between 400 nanometers and 500 nanometers. The control circuitry may receive the peak intensity value for that channel for each range of wavelengths from the illuminator.

In some implementations, the control circuitry converts the spectral sensitivity data into spectral sensitivity data values, where each of the spectral sensitivity data values represents a spectral response of a channel of the sensor to an emission from a particular illuminator of the calibration device. For example, the spectral sensitivity data may be received as voltages and converted to scaled data values (e.g., on a scale from zero to one or on a scale of minus one to one). In some implementations, the control circuitry may convert differently formatted data into a format that enables comparison to stored reference data values.

The control circuitry may retrieve reference spectral sensitivity data values for each of the one or more illuminators and/or for each emission from the one or more illuminators. Each spectral sensitivity data value may correspond to a channel of the sensor. For example, each channel may be associated with a specific wavelength range (e.g., 100 nanometer range between 400 nanometers and 500 nanometers) and the reference data may have intensity values for those specific wavelength ranges.

At this stage, the control circuitry compares each of the spectral sensitivity data values to a corresponding reference value of the retrieved reference spectral sensitivity data values and calculates, for the spectral sensitivity data values and based on the comparing, corresponding difference values. In some implementations, the difference values may be differences in scaled intensity values, differences in peak intensity values, differences in voltages, differences in percentages, or other suitable values.

The control circuitry generates, based on the difference values, a calibration matrix for the sensor and transmits the calibration matrix to a device associated with the sensor to be calibrated. For example, the calibration matrix may be a data structure that stores the difference values for each of the channels of the sensor. Thus, each of the difference values may correspond to a specific wavelength or wavelength range. The calibration device may transmit the calibration matrix to a device that is hosting the sensor.

In some implementations, the calibration device stores for each wavelength (e.g., for each available wavelength point) a corresponding difference value and generates other difference values for other wavelengths. For example, if the calibration matrix includes difference values for a wavelength of five hundred nanometers and a wavelength of six hundred nanometers, the control circuitry may interpolate a difference value for a wavelength of five hundred and fifty nanometers (e.g., using spline interpolation and standard colorimetric calculation).

In some implementations, the illumination source includes multiple illuminators that emit beams of different wavelengths. The more illuminators of different wavelengths that are included in the illumination source the better the calibration matrix accuracy will be. For example, if an illumination source includes thirty five different illuminators of different wavelength divided between visible light, ultraviolet light and infrared light, that illumination source will generate more difference values than an illumination source with only ten illuminators. In some implementations, the illumination source may be modified to include illuminators of different wavelength covering a sensitivity range of the spectral channels of the sensor that is being analyzed. For example, if the sensor being analyzed has channels that respond to only visible light wavelengths, the illumination source can be modified (e.g., different illuminators used) to cover that spectrum. In some implementations, the control circuitry causes beams to be emitted from illuminators that correspond to the response range of the sensor.

In some implementations, the illumination source includes an illuminator that emits beams of different wavelengths or ranges of wavelengths and/or different peak intensities. For example, the illumination source may be configured emit beams of different wavelengths or ranges of wavelengths covering a sensitivity range of the spectral channels of the sensor that is being analyzed. For example, if the sensor being analyzed has channels that respond to only visible light wavelengths, the illumination source can be modified or configured (e.g., the illuminator is configured) to cover that spectrum. In some implementations, the control circuitry causes an illuminator to emit beams that correspond to the response range of the sensor.

In some implementations, the control circuitry is further configured to transmit, to a device associated with the sensor, a command to calibrate the sensor based on the calibration matrix. For example, if the calibration device is used to calibrate cameras at the factory, the control circuitry may transmit the calibration matrix to the camera with a command to calibrate the camera based on the calibration matrix.

In some implementations, the spectral sensitivity data values include peak intensity values for wavelengths corresponding to the spectral channels. For example, each spectral channel may respond to an eighty nanometer spectrum (e.g., for one channel the range may be between 480 nanometers and 560 nanometers. Thus, each channel will respond to light at the channels specific range (for that channel any peak intensity values will be in the range of 480 to 560 nanometers). Thus, comparing each spectral sensitivity data value to a corresponding reference value may be performed by comparing, for each of the plurality of channels, the peak values for corresponding wavelengths. For example, if there are peak intensity values for 500 nanometers, 520 nanometers and 540 nanometers, those peak intensity values are compared with the reference values for 500, 520, and 540 nanometers respectively. In addition, if some sensitivity values or reference values are not received, those values may be interpolated (e.g. using spline interpolation and standard colorimetric calculation). After the comparison is performed or in some implementations as the comparison is being performed, each difference values for a corresponding peak intensity value is stored to generate a calibration matrix. In some implementations, the values may be modified to a desired format.

The details of one or more implementations are set forth in the accompanying drawings and the description below. Other features and advantages will be apparent from the description and drawings, and from the claims.

BRIEF DESCRIPTION OF THE DRAWINGS

FIG. 2 is a block diagram that illustrates actions for generating a calibration matrix.

FIG. 3 illustrates an example of a matrix and corresponding difference values for a three-channel sensor.

DETAILED DESCRIPTION

Figure 1:
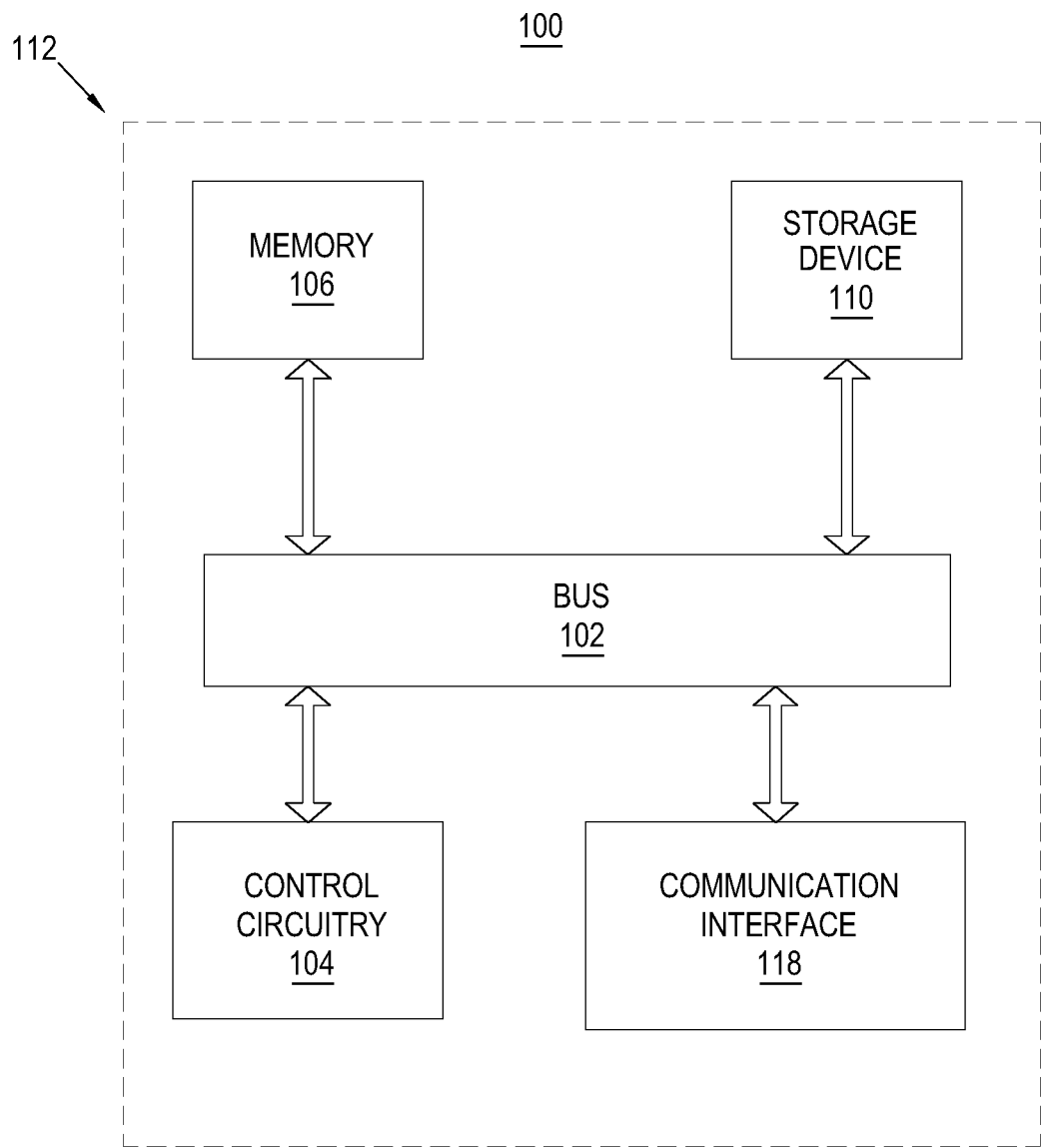
FIG. 1 illustrates a calibration device that may be used in performing the actions of this disclosure.

FIG. 1 illustrates a calibration device that may be used in performing the actions of this disclosure. In an implementation, calibration device 100 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

Computer system 100 may include a bus 102 or other communication mechanism for communicating information, and control circuitry (e.g., hardware processor) 104 coupled with a bus 102 for processing information. The control circuitry 104 is, for example, a general-purpose microprocessor. Computer system 100 also includes memory 106, such as a random-access memory (RAM) or other dynamic storage device, coupled to the bus 102 for storing information and instructions to be executed by processor 104. In one implementation, the memory 106 is used for storing temporary variables or other intermediate information during execution of instructions to be executed by the processor 104. Such instructions, when stored in non-transitory storage accessible to processor 104, render the computer system 100 into a special-purpose machine that is customized to perform the operations specified in the instructions.

Computer system 100 further includes a storage device 110 coupled to the bus 102 for storing information and instructions. For example, a storage device may include one or more of a magnetic disk, optical disk, solid-state drive, or another suitable device.

According to one implementation, the techniques in this disclosure are performed by computer system 100 in response to the control circuitry 104 executing one or more sequences of one or more instructions contained in memory 106. Such instructions may be read into memory 106 from another storage medium, such as the storage device 110. Execution of the sequences of instructions contained in the main memory 106 causes the control circuitry 104 to perform the process steps described. In alternative implementations, hard-wired control circuitry is used in place of or in combination with software instructions.

In some implementations, computer system 100 also includes a communication interface 118 coupled to the bus 102. Communication interface 118 provides a two-way data communication (e.g., with other devices). In some implementations, communication interface 118 sends and receives electrical, electromagnetic, or optical signals that carry digital data streams representing various types of information. Communication interface 118 may support a variety of protocols. For example, the communications interface may support Bluetooth, WiFi, USB, and other suitable protocols for connecting an external electronic device to computer system 100.

FIG. 2 is a block diagram that illustrates actions for generating a calibration matrix. In block 202, control circuitry (e.g., control circuitry 104) receives (e.g., via communications interface 118), from a sensor, spectral sensitivity data, where the spectral sensitivity data is generated based on spectral responses of spectral channels of a sensor to emissions from one or more light sources. For example, calibration device may be connected to a sensor being calibrated or through an *intermedia* device via communications interface 118. The communication interface 118 may receive the spectral sensitivity data and transmit it to the control circuitry 104 through bus 102.

In block 204, the control circuitry (e.g., control circuitry 104) converts the spectral sensitivity data into a plurality of spectral sensitivity data values, wherein each of the plurality spectral sensitivity data values represents a spectral response of a channel of the plurality of spectral channels to an emission from a light source of the plurality of light sources. For example, the control circuitry may receive the spectral sensitivity values as voltage or another count that a photodiode generates when it is hit by light.

In block 206, the control circuitry (e.g., control circuitry 104) retrieves, from the memory (e.g., memory 106), reference spectral sensitivity data values for each light, each spectral sensitivity data value corresponding to a spectral channel. For example, the memory may include data corresponding to spectral sensitivity values for various light sources. The data may be stored together with a corresponding identifier for each light source. When a light source emits a light, the identifier of the light source is transmitted to the control circuitry. The control circuitry uses the identifier to retrieve the references spectra sensitivity data values corresponding to the identifier.

In block 208, the control circuitry (e.g., control circuitry 104) compares each sensitivity data value to a corresponding reference value of reference spectral sensitivity data values. For example, each reference spectral sensitivity value may be stored together with an identifier of a corresponding spectral channel. The identifier may be an alphanumeric value that was generated when the reference value was generated. In some implementations, the identifier may be a range of wavelengths that the spectral channel responds to (e.g., five hundred nanometers to four hundred nanometers). The control circuitry may iterate through each value (i.e., for each spectral channel) and identify, based on the spectral channel identifier, a corresponding reference value for a channel with a matching channel identifier. The control circuitry then compares each matching pair of values (i.e., the value from the reference data is compared to a value received from the sensor for the matching channel).

In block 210, the control circuitry (e.g., control circuitry 104) calculates, for the plurality of spectral sensitivity data values and based on the comparing, a plurality of difference values. For example, the control circuitry may subtract the reference values from the corresponding (i.e., for corresponding spectral channel) measured spectral sensitivity values. In block 212, the control circuitry (e.g., control circuitry 104) generates, based on the plurality of difference values, a calibration matrix for the sensor.

FIG. 3 illustrates an example of a matrix and corresponding difference values for a three-channel sensor (e.g., RGB). Matrix 300 includes slots $C_{1,1}$ to $C_{3,3}$. Each slot is configured to hold a difference value (e.g., one of the difference values calculated as part of process 200). Matrix example 320 includes calculated values 322 that can be inserted into slots 302 to create a three by three matrix for a three-channel sensor (e.g., RGB sensor).

In some implementations, the control circuitry is configured to transmit the calibration matrix to a device comprising the sensor. For example, if the control circuitry uses the methods described above to configure a sensor built into an electronic device (e.g., a camera), the control circuitry may transmit the calibration matrix to that device to be used by the device.

In some implementations, the control circuitry uses peak intensity values for the wavelengths that the spectral channels respond to. For example, as a light source emits a light for a specific period of time, the control circuitry may use the highest intensity value recorded during that emission. In the implementations, where the control circuitry calculates and uses highest intensities (e.g., peak received levels), the control circuitry comparing the peak intensity values for corresponding wavelengths with the reference data that is also stored as corresponding peak intensity values (e.g., per a spectral channel where each channel corresponds to a wavelength range that it responds on). In these and other implementations, the control circuitry may store for each peak intensity value a corresponding difference value. For example, element 320 of FIG. 3 illustrates an example of the difference values stored.

In some implementations, the control circuitry may add the intensities for the period of time that the light is being emitted. In those implementations, the control circuitry may determine the emission period for the reference data (e.g., one second) and cause the emission of the light for the same period (e.g., one second) so that the reference data and the measured data has the same time period for comparison of the corresponding values. The control circuitry may further store with the matrix the differences together with the time interval (e.g., one second). So that the calibration matrix can be used together with the time interval.

In some implementations, the control circuitry causes the receipt of the measuring data. Specifically, the control circuitry causes a first emission from a first light source of multiple light sources, the first light source emitting light of a first type. For example, the first light source may be a halogen light, a fluorescent light, incandescent light or another type of light. In some implementations, a first light source may be configured to transmit light of a specific wavelength range. The control circuitry stores (e.g., in memory 106) spectral response from the plurality of channels to the first emission.

The control circuitry causes a second emission from a second light source of the multiple light sources, the second light source emitting light of a second wavelength. For example, the second light source may be a halogen light, a fluorescent light, incandescent light or another type of light. In some implementations, the second light source may be configured to transmit light of a specific wavelength range. The control circuitry stores (e.g., in memory 106) spectral response from the plurality of channels to the second emission. The control circuitry may repeat the process with every light source available for the calibration.

In some implementations, a calibration device may be used to calibrate a sensor. The calibration device includes an illumination source with a number of illuminators. Each illuminator may be configured to emit light of a specific wavelength range. For example, each illuminator may be a light emitting diode (LED) light. The illumination source may include other components. For example, the illumination source may include power conversion components as well as a command component to receive commands to start light emissions for a specific illuminator and to stop light emissions for the specific illuminator.

In some implementations, the control circuitry causes the receipt of the measuring data. Specifically, the control circuitry causes a first emission from one or more light sources. For example, the one or more light sources may comprise an apparatus configurable to separate and/or mix spectra components from one or more light sources, by using optical components. That is, the one or more light sources may comprise a configurable light source. In some embodiments, radiation from one or more light sources may be combined with spectral filters. In some embodiments, radiation from one or more light sources may be directed through one or more filters of a filter wheel, e.g. a mechanical device configurable to select and/or change an optical filter through which radiation from the one or more light sources is directed. In some embodiments, a wavelength of radiation from one or more light sources may be tuned. For example a Full-Width-at-Half-Maximum (FWHM) of the radiation may be defined by the width of slits, and/or a peak intensity of the radiation may be selected or configurable. In some embodiments, the one or more light sources may comprise a Digital Micromirror Device (DMD) based spectrally tunable light source. As such, it will be appreciated that some embodiments may comprise a multiplicity of different light sources, and other embodiments may comprise one or more configurable light sources that may be individually configured and/or combined with one or more other light sources. For example, in some example embodiments the one or more configurable light sources may be configured to emit radiation substantially comparable to a halogen light, a fluorescent light, an incandescent light or another type of light. In some implementations, the one or more configurable light sources may be configured to emit light of specific wavelength ranges.

Similarly, in some implementations, a calibration device may be used to calibrate a sensor. The calibration device may include an illumination source with one or more light sources. At least one of the one or more light sources may be a configurable light source, as described above.

Figure 4:
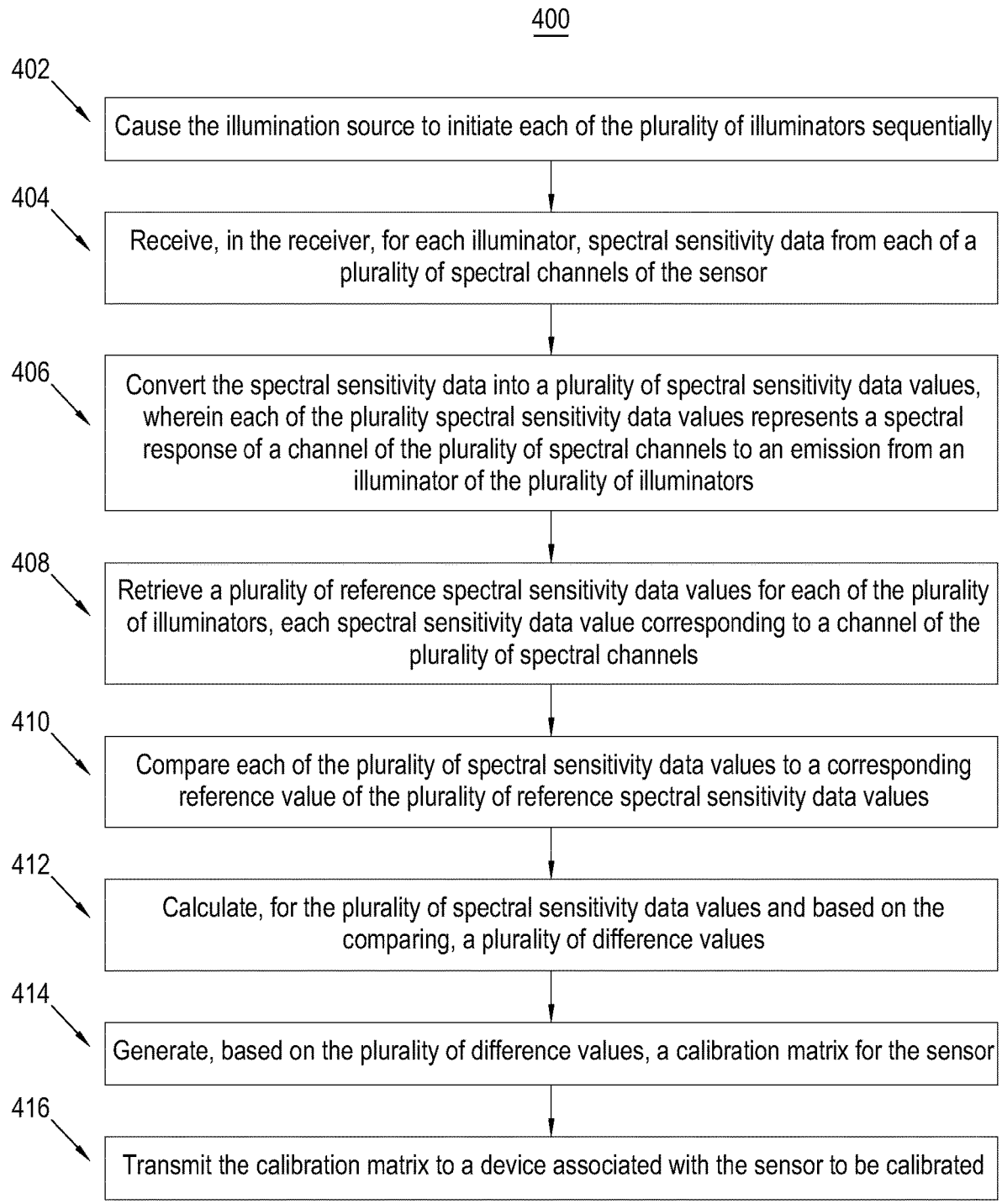
FIG. 4 illustrates actions that a control circuitry may perform to generate a calibration matrix for a given sensor.

The calibration device also includes a receiver operable to receive spectral response data for a plurality of spectral channels. The receiver may be connected to a housing that holds the sensor or may be connected to the sensor directly. The calibration device may also include control circuitry (e.g., a processor) coupled to the illumination source and the receiver. FIG. 4 illustrates actions that the control circuitry may perform to generate a calibration matrix for a given sensor.

In block 402, the control circuitry (e.g., control circuitry 104) causes the illumination source to initiate each of the illuminators sequentially. For example, the control circuitry may transmit a command to the illumination source to start an illumination sequence. The illumination source may light up each illuminator in sequence in response to the command. In some implementations, the control circuitry may transmit a command to the illumination source to light up specific illuminators. The control circuitry may transmit with the illumination command an identifier associated with the specific illuminator.

In block 404, the control circuitry (e.g., control circuitry 104) receives, in the receiver, for each illuminator, spectral sensitivity data from each of spectral channels of the sensor. For example, the calibration device may include an interface that connects to the sensor being calibrated. The receiver may be connected to one side of the interface and the sensor may be connected to another side of the interface.

In block 406, the control circuitry (e.g., control circuitry 104) converts the spectral sensitivity data into spectral sensitivity data values, where each of the spectral sensitivity data values represents a spectral response of a channel an emission from an illuminator. For example, the spectral sensitivity data may be received as voltages and converted to scaled data values (e.g., on a scale from zero to one or on a scale of minus one to one). In some implementations, the control circuitry may convert differently formatted data into a format that enables comparison to stored reference data values.

In block 408, the control circuitry (e.g., control circuitry 104) retrieves reference spectral sensitivity data values for each of the illuminators, each spectral sensitivity data value corresponding to a channel. For example, the memory may include data corresponding to spectral sensitivity values for various light sources. The data may be stored together with a corresponding identifier for each light source. When a light source emits a light, the identifier of the light source is transmitted to the control circuitry. The control circuitry uses the identifier to retrieve the references spectra sensitivity data values corresponding to the identifier.

In block 410, the control circuitry (e.g., control circuitry 104) compares each of the spectral sensitivity data values to a corresponding reference value of reference spectral sensitivity data values. For example, each reference spectral sensitivity value may be stored together with an identifier of a corresponding spectral channel. The identifier may be an alphanumeric value that was generated when the reference value was generated. In some implementations, the identifier may be a range of wavelengths that the spectral channel responds to (e.g., five hundred nanometers to four hundred nanometers). The control circuitry may iterate through each value (i.e., for each spectral channel) and identify, based on the spectral channel identifier, a corresponding reference value for a channel with a matching channel identifier. The control circuitry then compares each matching pair of values (i.e., the value from the reference data is compared to a value received from the sensor for the matching channel).

In block 412, the control circuitry calculates, for the spectral sensitivity data values and based on the comparing, corresponding difference values. For example, the control circuitry may subtract the reference values from the corresponding (i.e., for corresponding spectral channel) measured spectral sensitivity values. In block 414, the control circuitry (e.g., control circuitry 104) generates, based on the plurality of difference values, a calibration matrix for the sensor, and in block 416, the control circuitry (e.g., control circuitry 104) transmits the calibration matrix to a device associated with the sensor to be calibrated. For example, the calibration matrix may be a data structure based on an illustration of FIG. 3. The data structure may be generated and transmitted to the device associated with the sensor to be calibrated (e.g., a camera).

In some implementations, each illuminator operable to emit a beam of a certain wavelength that is different from the wavelength of beams of other illuminators. All or some of the illuminators combined may cover the wavelength range covering a sensitivity range of the spectral channels of the sensor being calibrated.

In some implementations, the control circuitry (e.g., control circuitry 104) transmits, to a device associated with the sensor, a command to calibrate the sensor based on the calibration matrix.

As discussed above, in some implementations, peak intensity values for a plurality of wavelengths corresponding to the plurality of spectral channels may be used in process 400. Thus, the control circuitry compares, for each of the plurality of channels, the peak intensity values for corresponding wavelengths and stores for each channel a corresponding peak intensity difference value.

Figure 5:
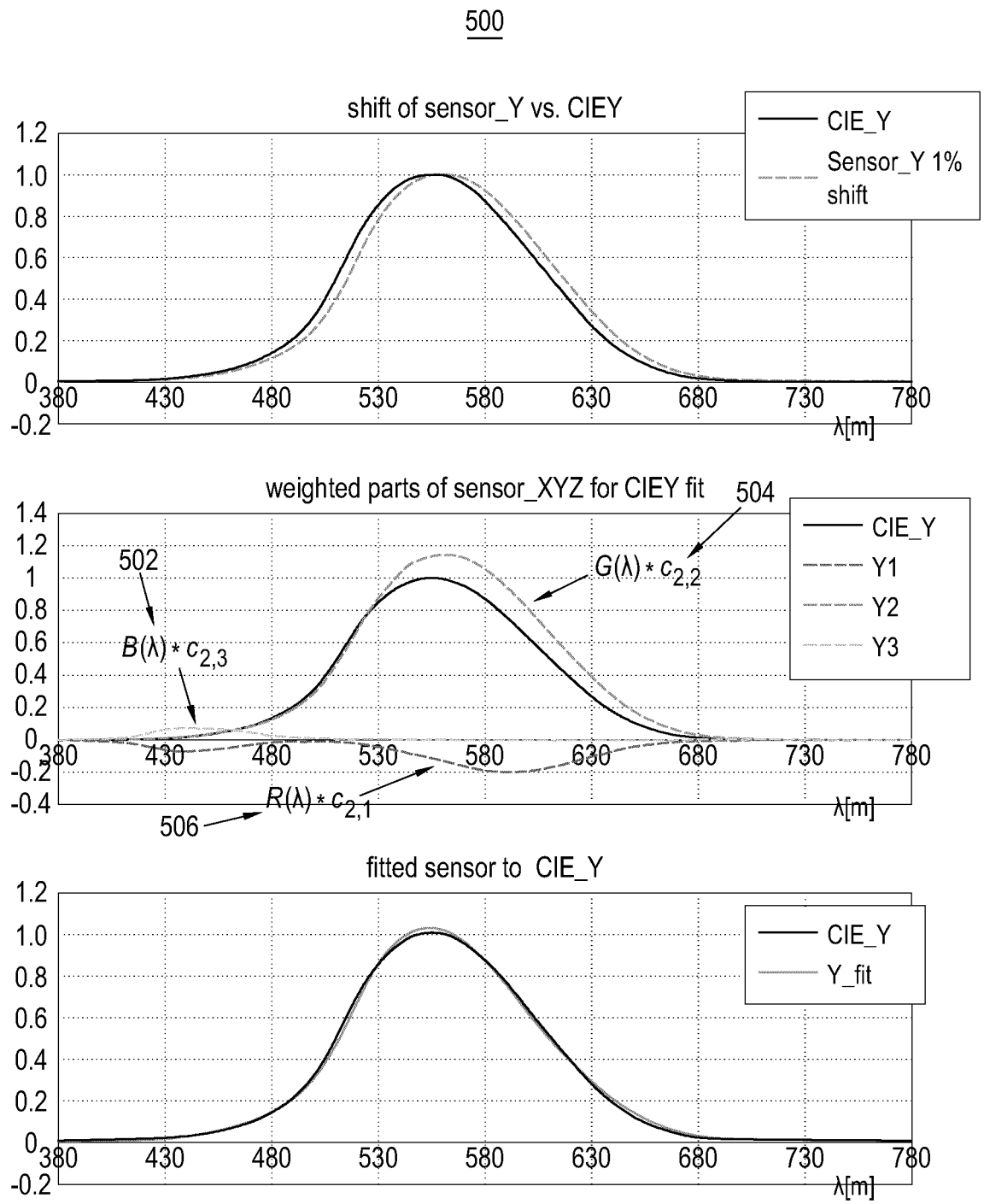
FIG. 5 illustrates color and spectra sensor for ambient light and target remission for a three-channel sensor.

FIG. 5 illustrates color and spectra sensor for ambient light and target remission for a three-channel sensor (e.g., a sensor responding to the red, green blue (RGB) spectrum. From the functions drawn, the Y channel is the best fit function. Using a matrix (e.g., matrix of FIG. 3) the Y channel can be calibrated using the Y-fit function. Y-fit from three-channel sensor is illustrated in more detail by:

$$Y(\lambda)_{fit} = R(\lambda) * c_{2,1} + G(\lambda) * c_{2,2} + B(\lambda) * c_{2,3}$$

Each of the functions is illustrated in FIG. 5. Function 502 corresponds the blue component of the Y-fit equation. Function 504 corresponds to the green component of the Y-fit equation and function 506 corresponds to the red component of the Y-fit equation. In this illustration, the CIE_Y has a respectable fit as shown by function 504. Thus, a calibration matrix can be extrapolated from the relationship of corresponding points on the function.

Figure 6:
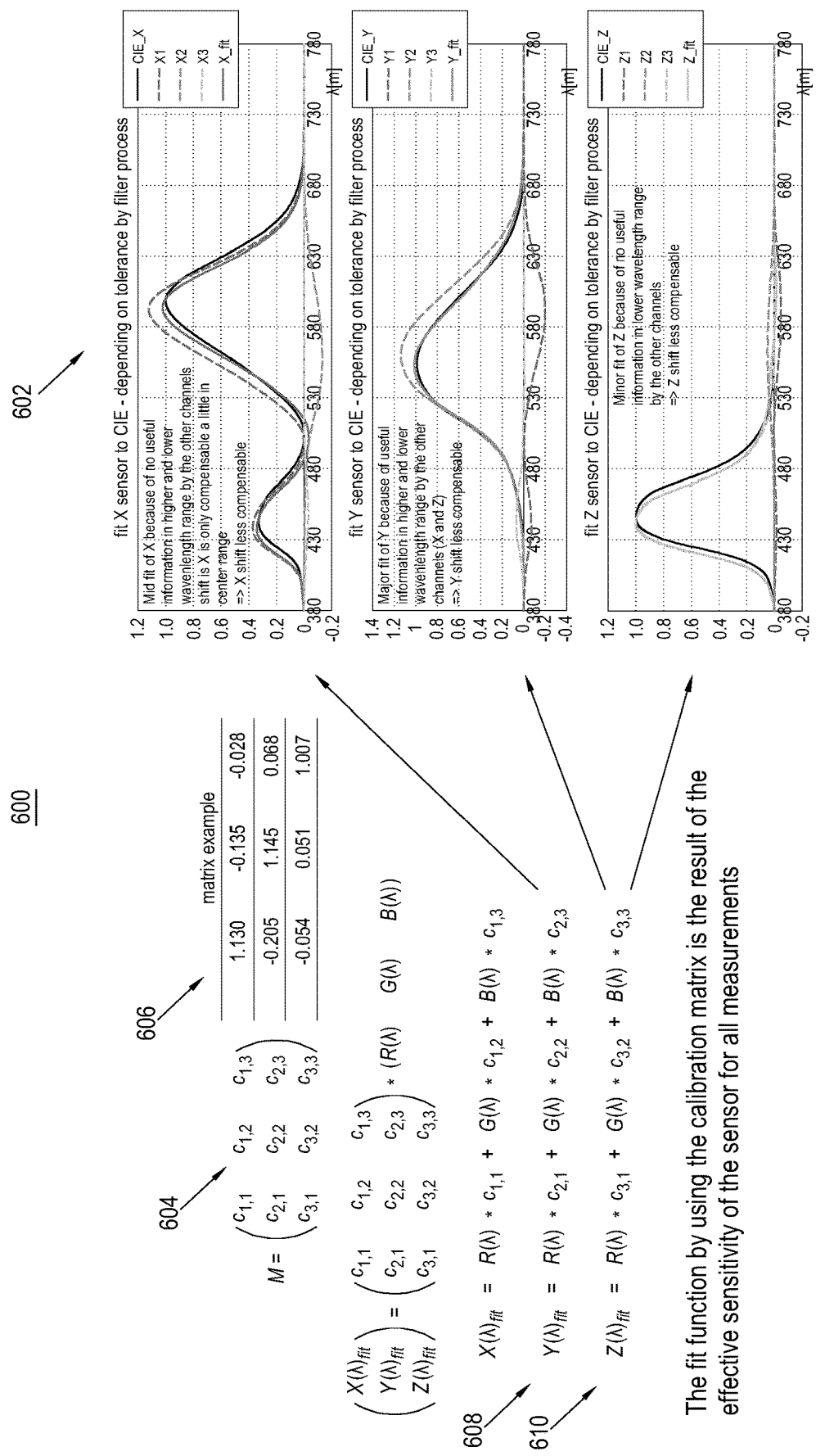
FIG. 6 illustrates another example of three-channel sensor calibration matrix extrapolation.

FIG. 6 illustrates another example of three-channel sensor calibration matrix extrapolation. From drawn function 602, the fit for the X function (e.g., one spectral channel) is somewhat acceptable because there is useful information in the medium wavelength range (e.g., 680 nanometers to 550 nanometers), but no useful information at the lower and higher wavelength range. Thus, adjusting the X channel can be accomplished by the following function:

$$X(\lambda)_{fit} = R(\lambda) * c_{1,1} + G(\lambda) * c_{1,2} + B(\lambda) * c_{1,3}$$

Where $c_{1,1}$ corresponds to value 604 and example value 606. Values $c_{1,2}$ and $c_{1,3}$ also have corresponding values in the example matrix. Y-fit function 608 and Z-function 610 illustrative functions for the other two channels in the three-channel sensor.

Figure 7:
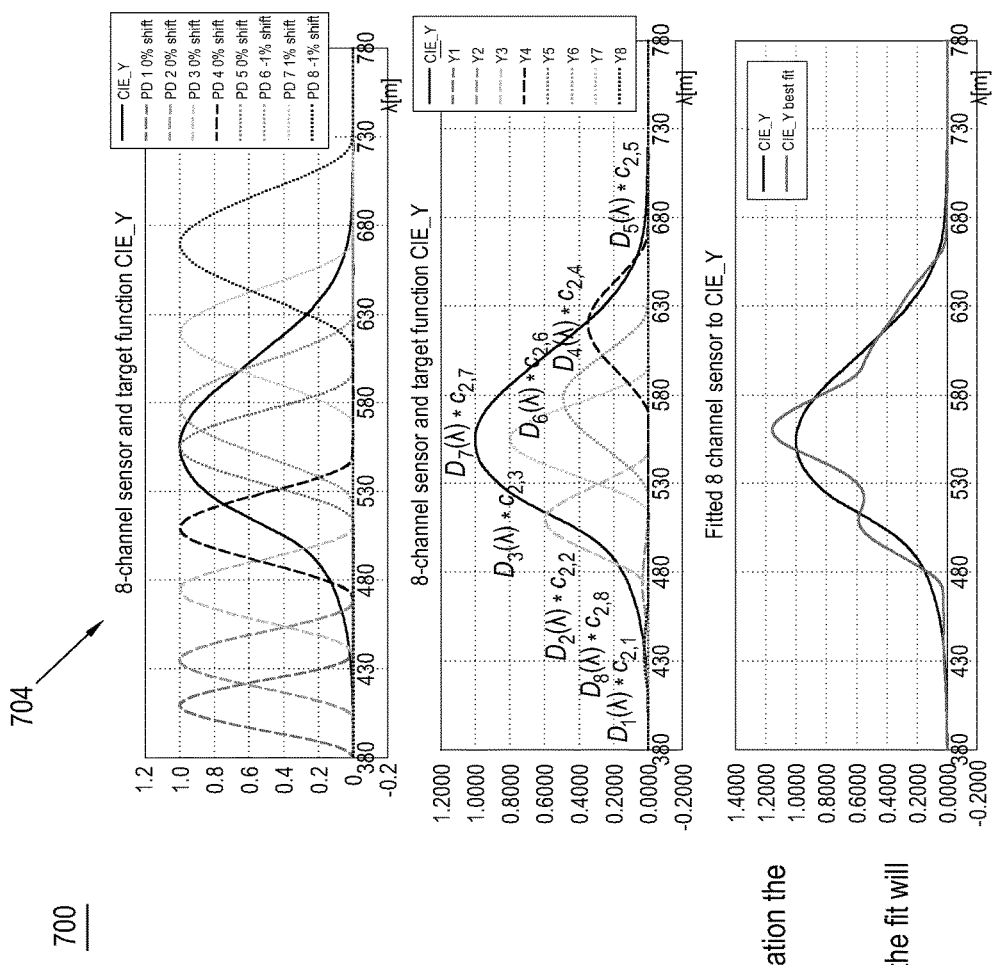
FIG. 7 illustrate various Y-fit functions for an eight-channel sensor.

FIG. 7 illustrate various Y-fit functions for an eight-channel sensor. The implementation is similar to what is discussed above with regard to a 3-channel sensor. Functions 702 determine that Y-fit for each sensor based on a matrix (not shown) while drawn functions 704 illustrate the Y-fit functions for each fit.

Figure 8:
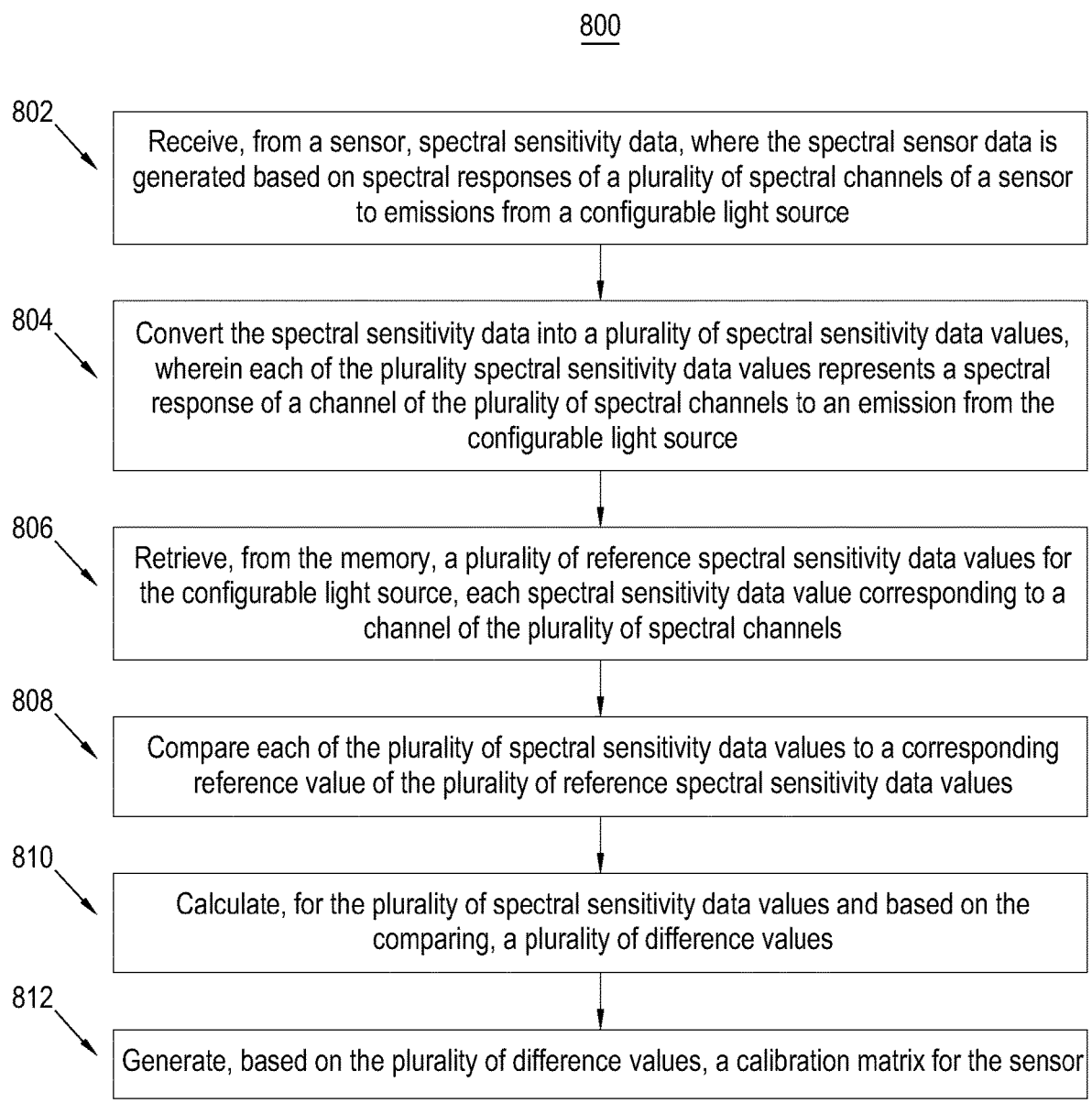
FIG. 8 is a block diagram that illustrates a further embodiment of actions for generating a calibration matrix.

FIG. 8 is a block diagram that illustrates another embodiment of actions for generating a calibration matrix. The embodiment shown in FIG. 8 is comparable to that shown in FIG. 2. However, rather than from a plurality of different light sources, the emissions are from a configurable light source. As described above, in some implementations the configurable light source may comprise an apparatus configurable to separate and/or mix spectra components from one or more light sources, by using optical components. In some embodiments, radiation from one or more light sources may be combined with spectral filters. In some embodiments, radiation from one or more light sources may be directed through one or more filters of a filter wheel, e.g. a mechanical device configurable to selected and/or change an optical filter through which radiation from the one or more light sources is directed. In some embodiments, a wavelength of radiation from one or more light sources may be tuned, for example a FWHM of the radiation may be defined by the width of slits, and/or a peak intensity of the radiation may be defined. In some embodiments, the one or more light sources may comprise a DMD-based spectrally tunable light source.

In block 802, control circuitry (e.g., control circuitry 104) receives (e.g., via communications interface 118), from a sensor, spectral sensitivity data, where the spectral sensitivity data is generated based on spectral responses of spectral channels of a sensor to emissions from the configurable light sources. For example, the calibration device may be connected to a sensor being calibrated or through an intermedia device via communications interface 118. The communication interface 118 may receive the spectral sensitivity data and transmit it to the control circuitry 104 through bus 102.

In block 804, the control circuitry (e.g., control circuitry 104) converts the spectral sensitivity data into a plurality of spectral sensitivity data values, wherein each of the plurality spectral sensitivity data values represents a spectral response of a channel of the plurality of spectral channels to an emission from the configurable light source. For example, the control circuitry may receive the spectral sensitivity values as voltage or another count that a photodiode generates when it is hit by light.

In block 806, the control circuitry (e.g., control circuitry 104) retrieves, from the memory (e.g., memory 106), reference spectral sensitivity data values for the configurable light source, e.g. each wavelength range emitted by the configurable light source, each spectral sensitivity data value corresponding to a spectral channel. For example, the memory may include data corresponding to spectral sensitivity values for various light sources. The data may be stored together with a corresponding identifier for the configurable light source, e.g. for each wavelength range emitted by the configurable light source. When the configurable light source emits light, e.g. radiation, the identifier of the light source is transmitted to the control circuitry. The control circuitry uses the identifier to retrieve the references spectra sensitivity data values corresponding to the identifier.

In block 808, the control circuitry (e.g., control circuitry 104) compares each sensitivity data value to a corresponding reference value of reference spectral sensitivity data values. For example, each reference spectral sensitivity value may be stored together with an identifier of a corresponding spectral channel. The identifier may be an alphanumeric value that was generated when the reference value was generated. In some implementations, the identifier may be a range of wavelengths that the spectral channel responds to (e.g., five hundred nanometers to four hundred nanometers). The control circuitry may iterate through each value (i.e., for each spectral channel) and identify, based on the spectral channel identifier, a corresponding reference value for a channel with a matching channel identifier. The control circuitry then compares each matching pair of values (i.e., the value from the reference data is compared to a value received from the sensor for the matching channel).

In block 810, the control circuitry (e.g., control circuitry 104) calculates, for the plurality of spectral sensitivity data values and based on the comparing, a plurality of difference values. For example, the control circuitry may subtract the reference values from the corresponding (i.e., for corresponding spectral channel) measured spectral sensitivity values. In block 812, the control circuitry (e.g., control circuitry 104) generates, based on the plurality of difference values, a calibration matrix for the sensor.

Figure 9:
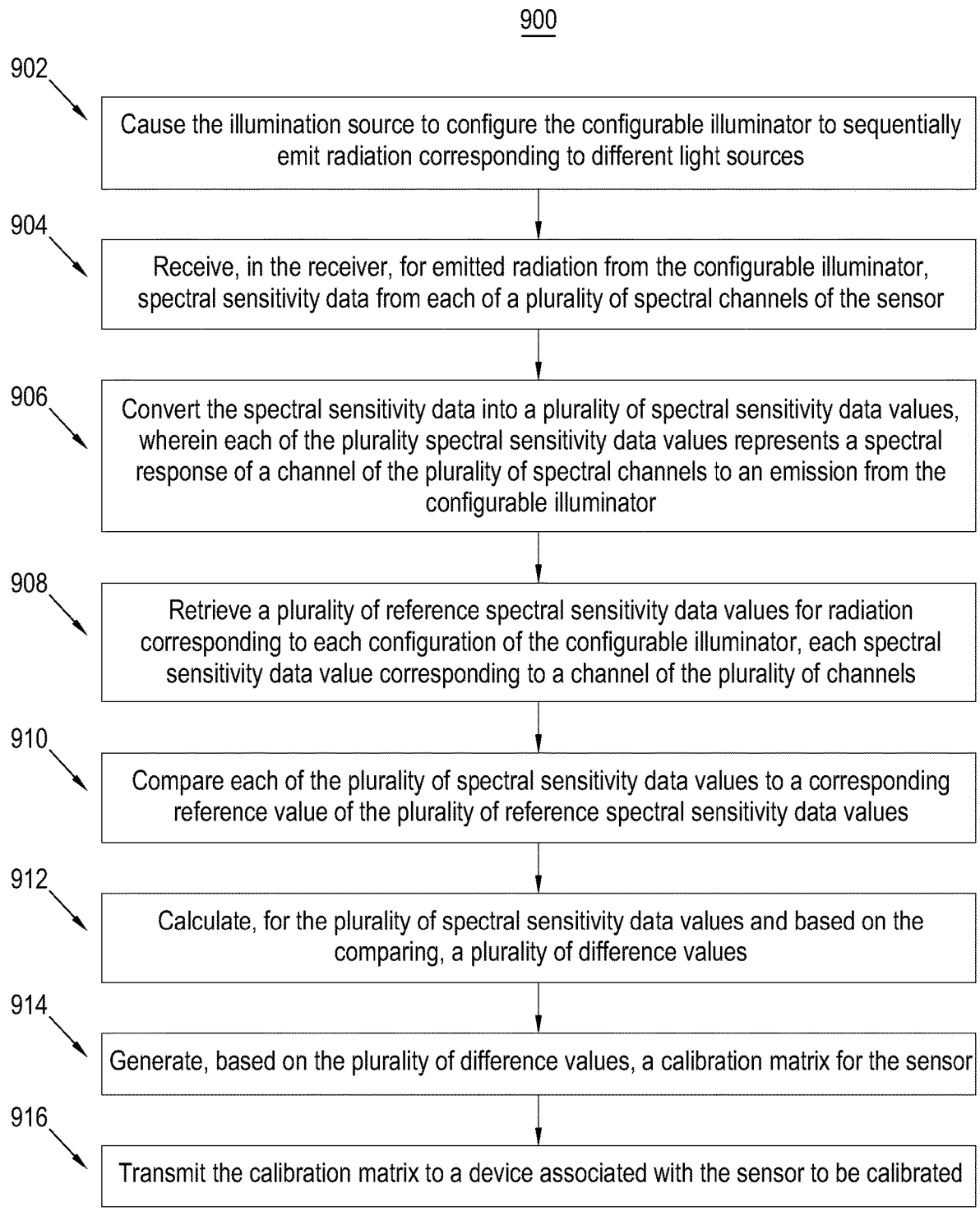
FIG. 9 illustrates a further embodiment of actions that a control circuitry may perform to generate a calibration matrix for a given sensor.

FIG. 9 illustrates another embodiment of actions that the control circuitry may perform to generate a calibration matrix for a given sensor. The embodiment shown in FIG. 9 is comparable to that shown in FIG. 4. However, rather than a plurality of different illuminators, the emissions are from an illuminator comprising a configurable light source. As such, the illuminator is a configurable illuminator.

In block 902, the control circuitry (e.g., control circuitry 104) causes the illumination source to configure the configurable illuminator to sequentially emit radiation corresponding to different light sources, e.g. having different ranges of wavelengths. For example, the control circuitry may transmit a command to the illumination source to start an illumination sequence. The illumination source configures the configurable illuminator in response to the command. In some implementations, the control circuitry may transmit a command to the illumination source to configure the configurable illuminator in a particular manner, e.g. to emit light corresponding to a particular light source such as a halogen light source, a fluorescent light source, or the like. The control circuitry may transmit with the illumination command an identifier associated with the specific illuminator.

In block 904, the control circuitry (e.g., control circuitry 104) receives, in the receiver, for the emitted radiation from the configurable illuminator, e.g. emitted radiation corresponding to each light source, spectral sensitivity data from each of spectral channels of the sensor. For example, the calibration device may include an interface that connects to the sensor being calibrated. The receiver may be connected to one side of the interface and the sensor may be connected to another side of the interface.

In block 906, the control circuitry (e.g., control circuitry 104) converts the spectral sensitivity data into spectral sensitivity data values, where each of the spectral sensitivity data values represents a spectral response of a channel an emission from the configurable illuminator. For example, the spectral sensitivity data may be received as voltages and converted to scaled data values (e.g., on a scale from zero to one or on a scale of minus one to one). In some implementations, the control circuitry may convert differently formatted data into a format that enables comparison to stored reference data values.

In block 908, the control circuitry (e.g., control circuitry 104) retrieves reference spectral sensitivity data values for radiation from the configurable illuminator, e.g. form each configuration of the configurable illuminator, each spectral sensitivity data value corresponding to a channel. For example, the memory may include data corresponding to spectral sensitivity values for various light sources. The data may be stored together with a corresponding identifier for each light source. When a light source emits a light, the identifier of the light source is transmitted to the control circuitry. The control circuitry uses the identifier to retrieve the references spectra sensitivity data values corresponding to the identifier.

In block 910, the control circuitry (e.g., control circuitry 104) compares each of the spectral sensitivity data values to a corresponding reference value of reference spectral sensitivity data values. For example, each reference spectral sensitivity value may be stored together with an identifier of a corresponding spectral channel. The identifier may be an alphanumeric value that was generated when the reference value was generated. In some implementations, the identifier may be a range of wavelengths that the spectral channel responds to (e.g., five hundred nanometers to four hundred nanometers). The control circuitry may iterate through each value (i.e., for each spectral channel) and identify, based on the spectral channel identifier, a corresponding reference value for a channel with a matching channel identifier. The control circuitry then compares each matching pair of values (i.e., the value from the reference data is compared to a value received from the sensor for the matching channel).

In block 912, the control circuitry calculates, for the spectral sensitivity data values and based on the comparing, corresponding difference values. For example, the control circuitry may subtract the reference values from the corresponding (i.e., for corresponding spectral channel) measured spectral sensitivity values. In block 914, the control circuitry (e.g., control circuitry 104) generates, based on the plurality of difference values, a calibration matrix for the sensor, and in block 916, the control circuitry (e.g., control circuitry 104) transmits the calibration matrix to a device associated with the sensor to be calibrated. For example, the calibration matrix may be a data structure based on an illustration of FIG. 3. The data structure may be generated and transmitted to the device associated with the sensor to be calibrated (e.g., a camera).

Various aspects of the subject matter and the functional operations described in this disclosure can be implemented in digital electronic circuitry, or in software, firmware, or hardware, including the structures disclosed in this specification and their structural equivalents, or in combinations of one or more of them. The electronic control unit incorporates digital control circuitry that is configured to perform the actions required to generate an ambient light measurement. In some embodiments, the electronic control unit may incorporate one or more of software, firmware, or other hardware to facilitate the actions of this disclosure. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A system comprising:
memory; and
control circuitry coupled to the memory, the control circuitry configured to:
receive, from a sensor, spectral sensitivity data, wherein the spectral sensitivity data is generated based on spectral responses of a plurality of spectral channels of the sensor to emissions from a plurality of light sources and/or from a configurable light source;
convert the spectral sensitivity data into a plurality of spectral sensitivity data values, wherein each of the plurality spectral sensitivity data values represents a spectral response of a channel of the plurality of spectral channels to an emission from a light source of the plurality of light sources and/or from the configurable light source;
retrieve, from the memory, a plurality of reference spectral sensitivity data values for each of the plurality of light sources and/or for each configuration of the configurable light source, each spectral sensitivity data value corresponding to a channel of the plurality of spectral channels;
compare each of the plurality of spectral sensitivity data values during an emission period to a corresponding reference value of the plurality of reference spectral sensitivity data values during the emission period;
calculate, for the plurality of spectral sensitivity data values and based on the comparing, a plurality of difference values during the emission period;
generate, based on the plurality of difference values, a calibration matrix for the sensor; and
cause an emission from the light source of the plurality of light sources and/or from the configurable light source during the emission period so that the corresponding reference value and the spectral sensitivity data have the same period for the comparison.

2. The system of claim 1, wherein the control circuitry is further configured to transmit the calibration matrix to a device comprising the sensor.

3. The system of claim 1, wherein the spectral sensitivity data values comprise peak intensity values for a plurality of wavelengths corresponding to the plurality of spectral channels.

4. The system of claim 3, wherein the control circuitry is configured to compare each of the plurality of spectral sensitivity data values to a corresponding reference value of the plurality of reference spectral sensitivity data values by:
comparing, for each of the plurality of channels, the peak intensity values for corresponding wavelengths.

5. The system of claim 4, wherein the control circuitry is configured to generate, the calibration matrix for the sensor by:
storing for each wavelength a corresponding difference value.

6. The system of claim 1, wherein the control circuitry is configured to receive the spectral sensitivity data by:
causing a first emission from a first light source of the plurality of light sources or from the configurable light source, the first light source or the configurable light source emitting light of a first wavelength;
storing spectral response from the plurality of channels to the first emission;
causing a second emission from a second light source of the plurality of light sources or from the configurable light source, the second light source or the configurable light source emitting light of a second wavelength; and
storing spectral response from the plurality of channels to the second emission.

7. An apparatus comprising:
an illumination source comprising a plurality of illuminators and/or a configurable illuminator; and
a receiver operable to receive spectral response data for a plurality of spectral channels;

control circuitry coupled to the illumination source and the receiver, the control circuitry configured to:
cause the illumination source to initiate each of the plurality of illuminators sequentially, or cause the illumination source to configure the configurable illuminator to sequentially emit radiation corresponding to different light sources;
receive, in the receiver, for each illuminator and/or for the configurable illuminator, spectral sensitivity data from each of a plurality of spectral channels of a sensor;
convert the spectral sensitivity data into a plurality of spectral sensitivity data values, wherein each of the plurality spectral sensitivity data values represents a spectral response of a channel of the plurality of spectral channels to an emission from an illuminator of the plurality of illuminators and/or from the configurable illuminator;
retrieve a plurality of reference spectral sensitivity data values for each of the plurality of illuminators and/or for each configuration of the configurable illuminator, each spectral sensitivity data value corresponding to a channel of the plurality of spectral channels;
compare each of the plurality of spectral sensitivity data values during an emission period to a corresponding reference value of the plurality of reference spectral sensitivity data values during the emission period;
calculate, for the plurality of spectral sensitivity data values and based on the comparing, a plurality of difference values during the emission period;
generate, based on the plurality of difference values, a calibration matrix for the sensor; and
transmit the calibration matrix to a device associated with the sensor to be calibrated; and
cause an emission from the illuminator of the plurality of illuminators and/or from the configurable illuminator during the emission period so that the corresponding reference value and the spectral sensitivity data have the same period for the comparison.

8. The apparatus of claim 7, wherein the illumination source comprises a first illuminator and a second illuminator, and wherein the first illuminator is operable to emit a beam of a first wavelength and the second illuminator is operable to transmit a beam of a second wavelength.

9. The apparatus of claim 7, wherein the plurality of illuminators comprises illuminators of different wavelength covering a sensitivity range of the spectral channels.

10. The apparatus of claim 7, wherein the control circuitry is further configured to:
transmit, to a device associated with the sensor, a command to calibrate the sensor based on the calibration matrix.

11. The apparatus of claim 7, wherein the spectral sensitivity data values comprise peak intensity values for a plurality of wavelengths corresponding to the plurality of spectral channels.

12. The apparatus of claim 11, wherein the control circuitry is configured to compare each of the plurality of spectral sensitivity data values to a corresponding reference value of the plurality of reference spectral sensitivity data values by:
comparing, for each of the plurality of channels, the peak values for corresponding wavelengths.

13. The apparatus of claim 12, wherein the control circuitry is configured to generate, the calibration matrix for the sensor by:
storing for each channel a corresponding peak intensity difference value.

14. A method comprising:
receiving, from a sensor, spectral sensitivity data, wherein the spectral sensitivity data is generated based on spectral responses of a plurality of spectral channels of the sensor to emissions from a plurality of light sources and/or from a configurable light source;
converting the spectral sensitivity data into a plurality of spectral sensitivity data values, wherein each of the plurality spectral sensitivity data values represents a spectral response of a channel of the plurality of spectral channels to an emission from a light source of the plurality of light sources and/or from a configurable light source;
retrieving, from a memory, a plurality of reference spectral sensitivity data values for each of the plurality of light sources and/or for each configuration of the configurable light source, each spectral sensitivity data value corresponding to a channel of the plurality of spectral channels;
comparing each of the plurality of spectral sensitivity data values during an emission period to a corresponding reference value of the plurality of reference spectral sensitivity data values during the emission period;
calculating, for the plurality of spectral sensitivity data values and based on the comparing, a plurality of difference values during the emission period; and
generating, based on the plurality of difference values, a calibration matrix for the sensor; and
causing an emission from the light source of the plurality of light sources and/or from the configurable light source during the emission period so that the corresponding reference value and the spectral sensitivity data have the same period for the comparison.

15. The method of claim 14, further comprising transmitting the calibration matrix to a device comprising the sensor.

16. The method of claim 14, wherein the spectral sensitivity data values comprise peak intensity values for a plurality of wavelengths corresponding to the plurality of spectral channels.

17. The method of claim 16, wherein comparing each of the plurality of spectral sensitivity data values to a corresponding reference value of the plurality of reference spectral sensitivity data values comprises comparing, for each of the plurality of channels, the peak intensity values for corresponding wavelengths.

18. The method of claim 17, wherein generating, the calibration matrix for the sensor comprises storing for each wavelength a corresponding difference value.

19. The method of claim 14, wherein receiving the spectral sensitivity data comprises:
causing a first emission from a first light source of the plurality of light sources or from the configurable light source, the first light source or the configurable light source emitting light of a first wavelength;
storing spectral response from the plurality of channels to the first emission;
causing a second emission from a second light source of the plurality of light sources or from the configurable light source, the second light source or the configurable light source emitting light of a second wavelength; and
storing spectral response from the plurality of channels to the second emission.

* * * * *